Feb. 9, 1937.     W. A. BRECHT     2,070,329
FLEXIBLE GEAR DRIVE
Filed Sept. 29, 1934

WITNESSES:

INVENTOR
Winston A. Brecht.
ATTORNEY

Patented Feb. 9, 1937

2,070,329

UNITED STATES PATENT OFFICE 2,070,329

FLEXIBLE GEAR DRIVE

Winston A. Brecht, Pittsburgh, Pa., assignor to Westinghouse Electric & Manufacturing Company, East Pittsburgh, Pa., a corporation of Pennsylvania Application September 29, 1934, Serial No. 746,187

8 Claims. (Cl. 64—27)

My invention relates, generally, to flexible gear drives and more particularly to flexible and shear pinions for use in gear driving mechanisms.

In order to prevent injury to gear driving mechanisms which are subjected to sudden shocks, as for example, gear driven axle generators for railway cars which may be suddenly bumped during switching operations, it is necessary to provide a flexible or resilient gear driving mechanism. Furthermore, in the event that the driven member, for instance the armature of an axle generator, should become locked, it is necessary to completely release the driven member from the driving member in order to prevent further damage to the generator and the gear unit, or sliding of the wheels.

An object of my invention, generally stated, is to provide a flexible gear driving mechanism which shall be simple and reliable in operation and which may be economically manufactured and installed.

A more specific object of my invention is to provide for resiliently connecting a gear to a power transmitting shaft.

Another object of my invention is to provide for automatically releasing a gear from its cooperating shaft when the torque exceeds a predetermined value.

Other objects of my invention will be explained fully hereinafter or will be apparent to those skilled in the art.

According to the preferred embodiment of my invention, the resilient element of a flexible driving mechanism is incorporated in a pinion which is driven by a gear. The resilient member comprises a notched ring composed of rubber or other suitable resilient material. Torque is transmitted from the pinion through projections on the end of the pinion which mesh with notches in one side of the rubber ring, to a flanged collar which is splined on a shaft and engages notches in the other side of the rubber ring. The rubber ring deflects torsionally under torque and will shear at a predetermined value of torque, thereby releasing the pinion from the shaft.

For a fuller understanding of the nature and objects of my invention, reference may be had to the following detailed description, taken in conjunction with the accompanying drawing, in which.

Figure 1:
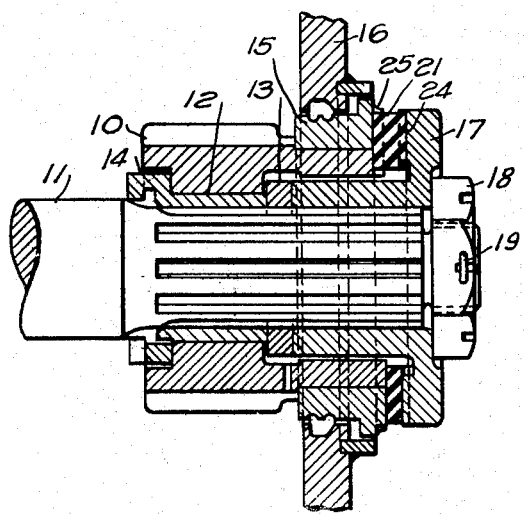
Figure 1 is a view in section, taken along the line I—I of Fig. 2.
Figure 2:
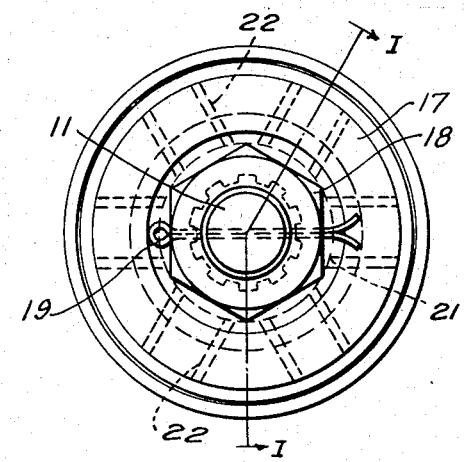
Fig. 2 is a view in end elevation of a flexible pinion embodying my invention.
Figure 3:
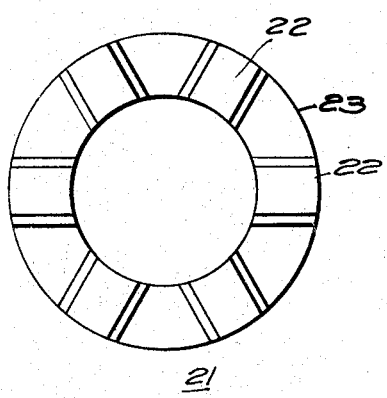
Fig. 3 is a view in side elevation of the resilient ring utilized in the flexible pinion assembly.
Figure 4:
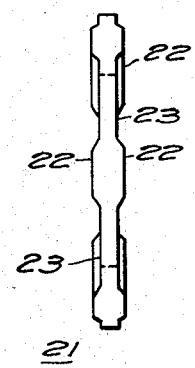
Fig. 4 is a view in end elevation of the ring shown in Fig. 3.

Referring to the drawing, the embodiment of the gear drive illustrated, comprises a pinion 10 which is disposed to mesh with a gear (not shown). The pinion 10 is rotatably mounted on a shaft 11 with a sleeve bearing 12 interposed between the pinion and the shaft. A thrust bearing 13 is also provided at one end of the sleeve bearing 12, which is provided with a shoulder 14 on the other end, thereby retaining the pinion in position on the shaft. An oil retaining ring 15 is shrunk onto the pinion 10 and the gear assembly is enclosed within a gear case 16 only a portion of which is illustrated. A flanged collar 17 is splined on the shaft 11 and is removably secured thereon by a nut 18 threaded onto the end of the shaft 11 and locked in position by a cotter key 19.

In order to transmit torque from the pinion 10 to the shaft 11 and to prevent injury to gears in the event of sudden impacts, a ring 21, which may be composed of rubber or other suitable resilient material, is interposed between the end of the pinion 10 and the flange of the collar 17. As shown, the sides of the ring 21 are provided with a plurality of radial projections 22 and notches 23. The projections on one side of the ring engage slots 24 in the flange of the collar 17 and the projections on the other side of the ring 21 engage similar slots 25 provided in the end of the pinion 10 and the side of the oil ring 15, which is shrunk on the pinion.

The rubber ring 21 deflects torsionally under torque and will shear at a predetermined value of torque, thereby completely releasing the pinion 10 from the shaft 11. Since the pinion is mounted on the bearing 12, it can rotate freely on the shaft after failure of the rubber ring without damaging any of the other parts of the driving mechanism.

In this manner normal torque may be transmitted from the pinion to the shaft, or vice versa, and injury from sudden impacts is prevented by the resiliency of the rubber ring 21. In the event that the shaft becomes locked or overloaded, the ring 21 shears, thereby preventing injury to the driving mechanism.

It will be noted that the rubber ring 21 is outside of the gear case 16 and, therefore, can be replaced quickly by simply removing the nut 18 and the collar 17. It is not necessary to open the gear unit to replace the rubber ring in the event that it shears. In case it is desired to disconnect the pinion from the shaft in order to operate the generator, or other apparatus driven by the shaft 11, for testing purposes, the ring 21 may be readily removed which will permit the shaft to rotate free of the pinion.

While the gear drive herein described is particularly adapted for transmitting torque to an electric generator which is driven from the axle of a railway car, it is not limited thereto and has numerous other applications wherein a flexible driving mechanism is required.

I do not desire to be restricted to the specific embodiment of my invention herein shown and described, since it is evident that it may be changed and modified without departing from the spirit and scope of my invention as defined in the appended claims.

I claim as my invention:

1. A gear drive comprising a shaft, a gear element rotatably mounted on the shaft, a collar secured to the shaft, a portion of said gear element overlapping a portion of said collar, and a resilient shearable ring for resiliently connecting the overlapping end of the gear element to the collar to drive the shaft without slippage unless the ring is sheared.

2. A gear drive comprising a shaft, a gear element rotatably mounted on the shaft, a collar removably secured to the shaft, a portion of said gear element overlapping a portion of said collar, and a resilient shearable ring interposed between the overlapping end of the gear element and the collar for resiliently connecting the gear element to the collar to drive the shaft without slippage unless the ring is sheared.

3. A gear drive comprising a shaft, a gear element rotatably mounted on the shaft, a flanged collar removably secured to the shaft, a portion of said gear element overlapping a portion of said collar, and a resilient shearable ring interposed between the overlapping end of the gear element and the flange of the collar for resiliently connecting the gear element to the collar to drive the shaft without slippage unless the ring is sheared.

4. A gear drive comprising a shaft, a pinion rotatably mounted on the shaft, a collar splined on the shaft, a portion of said pinion being disposed to overlap a portion of said collar, and a resilient shearable ring for resiliently connecting the overlapping portion of the pinion to the collar to drive the shaft without slippage unless the ring is sheared.

5. A gear drive comprising a shaft, a pinion rotatably mounted on the shaft, a bearing member interposed between the pinion and the shaft to prevent longitudinal movement of the pinion on the shaft, a portion of said pinion being disposed to overlap a portion of said collar, a collar splined on the shaft, and a resilient shearable ring interposed between the overlapping end of the pinion and the collar for resiliently connecting the pinion to the collar to drive the shaft without slippage unless the ring is sheared.

6. A gear drive comprising a shaft, a pinion rotatably mounted on the shaft, a sleeve bearing interposed between the pinion and the shaft to prevent longitudinal movement of the pinion on the shaft, a flanged collar splined on the shaft, a portion of said pinion overlapping a portion of said collar, and a resilient shearable ring interposed between the overlapping end of the pinion and the flange of the collar for resiliently connecting the pinion to the collar to drive the shaft without slippage unless the ring is sheared.

7. A gear drive comprising a shaft, a pinion rotatably mounted on the shaft, a bearing member disposed between the shaft and the pinion, a collar splined on the shaft, a portion of said pinion overlapping a portion of said collar, and a notched ring composed of resilient shearable material disposed between the overlapping portion of the pinion and the collar for resiliently connecting the pinion to the collar and permitting the pinion to rotate freely on the bearing under predetermined conditions.

8. A gear drive comprising a shaft, a pinion rotatably mounted on the shaft, a sleeve bearing interposed between the pinion and the shaft, a flanged collar splined on the shaft, a portion of said pinion overlapping a portion of said collar, and a notched ring composed of resilient shearable material disposed between the overlapping end of the pinion and the flange on the collar for resiliently connecting the pinion to the collar and permitting the pinion to rotate freely on the bearing in the event of the shearing of said ring.

WINSTON A. BRECHT.